US 6,895,550 B2

(12) United States Patent
Kanchirayappa et al.

(10) Patent No.: US 6,895,550 B2
(45) Date of Patent: May 17, 2005

(54) COMPUTER-IMPLEMENTED PDF DOCUMENT MANAGEMENT

(75) Inventors: Virupaksha N. Kanchirayappa, Bangalore (IN); Natarajan Chandramouli, Bangalore (IN)

(73) Assignee: i2 Technologies US, Inc., Dallas, TX (US)

(*) Notice: Subject to any disclaimer, the term of this patent is extended or adjusted under 35 U.S.C. 154(b) by 685 days.

(21) Appl. No.: 10/008,898

(22) Filed: Dec. 5, 2001

(65) Prior Publication Data

US 2003/0106017 A1 Jun. 5, 2003

(51) Int. Cl.[7] .............................................. G06F 17/24
(52) U.S. Cl. ...................................................... 715/511
(58) Field of Search ............................... 715/511, 531, 715/513; 707/200, 102

(56) References Cited

U.S. PATENT DOCUMENTS

| | | | | | |
|---|---|---|---|---|---|
| 5,819,300 | A | * | 10/1998 | Kohno et al. | 715/511 |
| 5,832,263 | A | * | 11/1998 | Hansen et al. | 707/200 |
| 6,240,409 | B1 | * | 5/2001 | Aiken | 715/531 |
| 6,324,555 | B1 | * | 11/2001 | Sites | 715/511 |
| 6,519,557 | B1 | * | 2/2003 | Emens et al. | 715/513 |
| 6,658,423 | B1 | * | 12/2003 | Pugh et al. | 707/102 |
| 6,658,626 | B1 | * | 12/2003 | Aiken | 715/511 |

OTHER PUBLICATIONS

Adobe Creative Team, Adobe Acrobat 5.0 Classroom In A Book, Lesson 5—Putting Documents Online and Lesson 7—Using Acrobat in a Document Review Cycle (Adobe Press, Jun. 26, 2004).*

Dennis, Real World PDF With Adobe Acrobat 5, Chapter 4—Collaborating, Repurposing, and Proofing (Peachpit Press, Dec. 13, 2001).*
Alspach, PDF With Acrobat 5: Visual Quickstart Guide, Chapter 2—Acrobat Reader in Depth and Chapter 11—Catalog, Indexes, Searches (Peachpit Press, Aug. 31, 2001).*
Steward, PDF HACKS, Chapter 2—Managing a Collection (O'Reilly Publishing, Aug. 2004).*

* cited by examiner

Primary Examiner—Heather R. Herndon
Assistant Examiner—Doug Hutton
(74) Attorney, Agent, or Firm—James E. Walton

(57) ABSTRACT

A PDF file is received from an external application and key information from the PDF file, concerning a PDF document contained in the PDF file, is extracted. The extracted key information is compared with analogous reference information stored for previously received PDF documents to determine a status for the received PDF document, which is provided to the external application from which the PDF file was received. The received PDF document is a duplicate if all the extracted key information matches analogous reference information, is an updated document if certain but not all the extracted key information matches analogous reference information, or is a new document if at least certain extracted key information does not match analogous reference information. If the PDF document is a duplicate document, processing of the PDF file is returned to the application without storing any extracted key information as reference information. If the PDF document is an updated document, certain extracted key information is stored to update the reference information and processing of the PDF file is returned to the application. If the PDF document is new, all extracted key information is stored as reference information and processing of the PDF file is returned to the application.

16 Claims, 2 Drawing Sheets

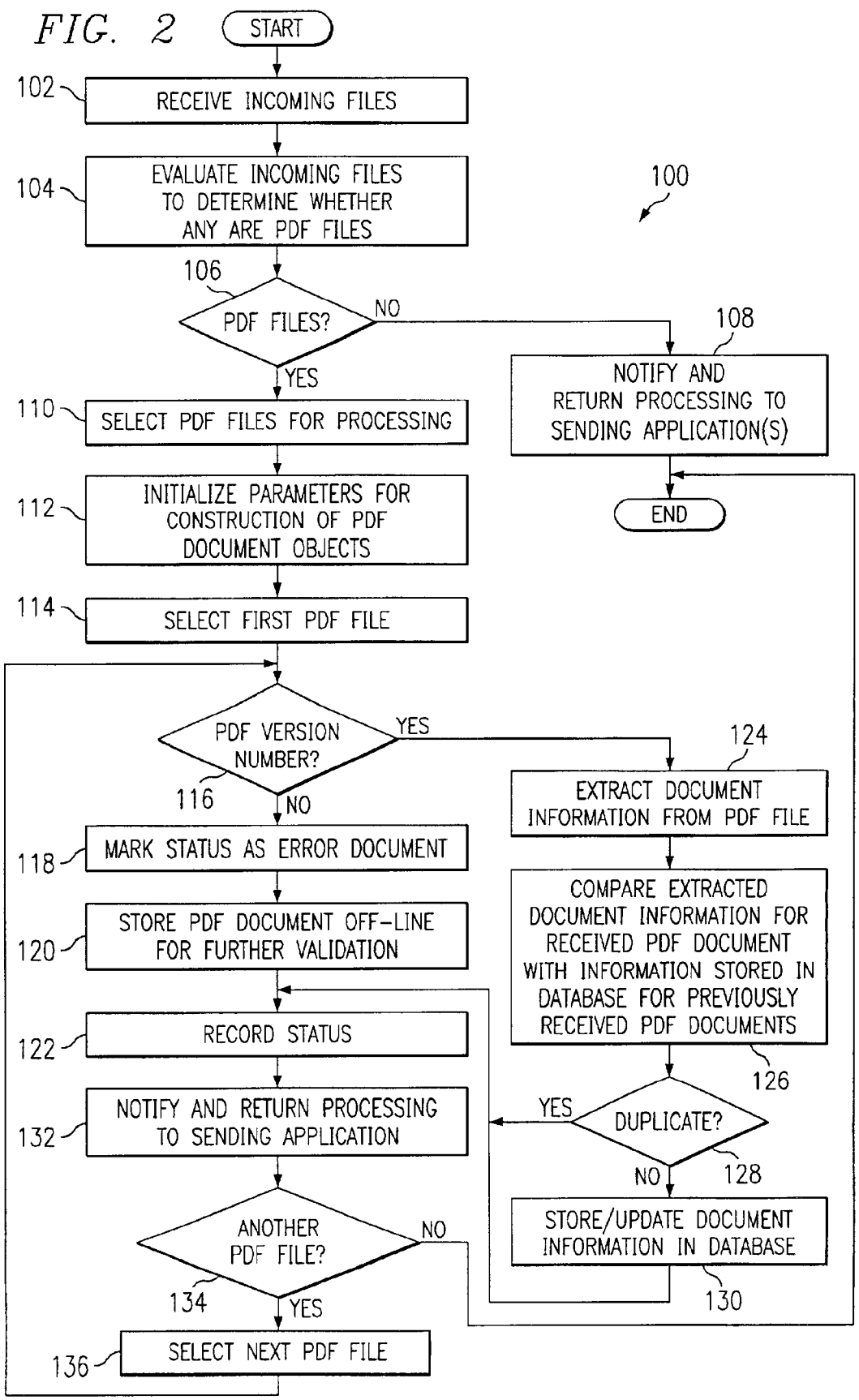

COMPUTER-IMPLEMENTED PDF DOCUMENT MANAGEMENT

BACKGROUND OF THE INVENTION

Portable Document Format (PDF) is a file format developed by ADOBE SYSTEMS INCORPORATED that allows documents formatted in PDF to be retrieved for on-line viewing, using a computer monitor for example, in the same manner that hard copies of the documents would be viewed off-line. For example, PDF documents can be viewed page by page and scrolled through on-line according to particular needs of users. To view PDF documents, applications such as ADOBE ACROBAT EXCHANGE or ADOBE ACROBAT READER are typically required. Using such applications in content-based document retrieval operations, where large numbers of PDF documents may need to be retrieved for viewing on an ongoing basis, significant time and effort may be expended in determining whether retrieved PDF documents are duplicates (same document previously retrieved), updates (changes to previously retrieved document), or new (first time document retrieved).

SUMMARY OF THE INVENTION

According to the present invention, disadvantages and problems associated with previous techniques for handling PDF documents may be reduced or eliminated.

In one embodiment of the present invention, a method of PDF document management includes receiving files from one or more external applications, determining whether each received file is a PDF file, and extracting key information from each received PDF file concerning a corresponding PDF document contained in the PDF file. The extracted key information for each received PDF document is compared with analogous reference information stored for previously received PDF documents to determine a verification status for each received PDF document according to the comparison, which is provided to the external application from which the PDF file was received. The verification status indicates that the received PDF document is a duplicate document if all the extracted key information for the received PDF document matches analogous reference information for a previously received PDF document. The verification status indicates that the received PDF document is an updated document if certain but not all the key extracted information for the received PDF document matches analogous reference information for a previously received PDF document. The verification status indicates that the received PDF document is a new document if at least certain extracted key information for the received PDF document does not match analogous reference information for a previously received PDF document. If the received PDF document is a duplicate document, processing of the received PDF file is returned to the external application from which it was received, without storing any extracted key information for the received PDF document as reference information. If the received PDF document is an updated document, certain extracted key information for the received PDF document is stored to update the reference information, and processing of the received PDF file is returned to the external application from which it was received. If the received PDF document is a new document, all extracted key information for the received PDF document is stored as reference information, and processing of the received PDF file is returned to the external application from which it was received.

Particular embodiments of the present invention may provide one or more technical advantages. For example, certain embodiments of the present invention may provide a computer-implemented technique for automatically determining whether received PDF documents are duplicates (same document previously received), updates (changes to previously received document), or new (first time document received), without having to use applications such as ADOBE ACROBAT READER or ADOBE ACROBAT EXCHANGE. As a result, in addition to eliminating the need to purchase and maintain such applications, the present invention may significantly reduce the time and effort expended for content-based document retrieval operations involving large numbers of PDF documents. Certain embodiments of the present invention may provide some, all, or none of these advantages. One or more other technical advantages may be readily apparent to one skilled in the art from the figures, description, and claims included herein.

BRIEF DESCRIPTION OF THE DRAWINGS

For a more complete understanding of the present invention and its advantages, reference is now made to the following descriptions, taken in conjunction with the accompanying drawings, in which:

FIG. 2 illustrates an example computer-implemented method of PDF document management.

DESCRIPTION OF EXAMPLE EMBODIMENTS

Figure 1:
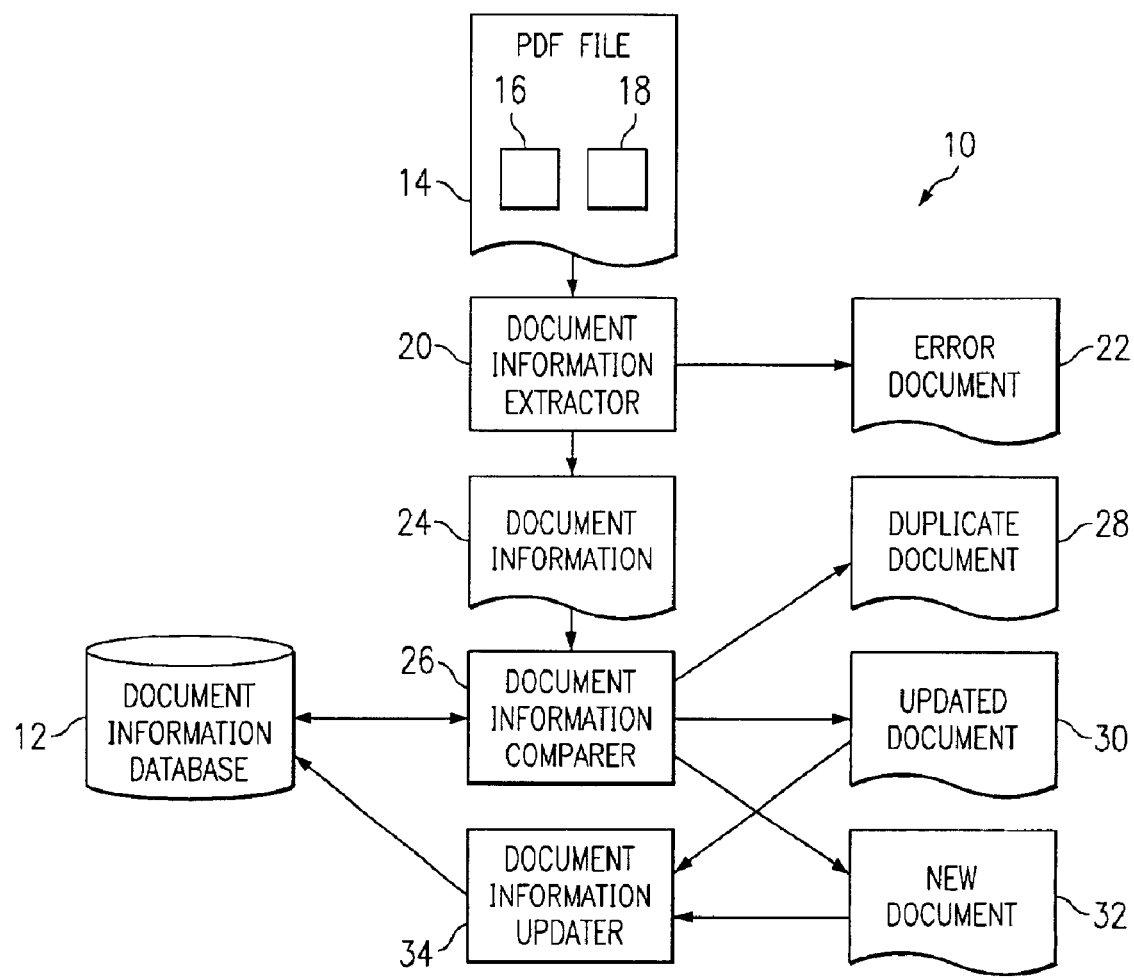
FIG. 1 illustrates an example computer-implemented system for PDF document management.

Example embodiments of the present invention and its advantages are best understood by referring to FIGS. 1 and 2 of the drawings, like numerals being used for like and corresponding parts of the various drawings.

FIG. 1 illustrates an example computer-implemented system 10 for PDF document management. Although system 10 is described to provide an example of the type of environment in which PDF document management may be implemented according to the present invention, the present invention contemplates any suitable PDF document management environment and is not intended to be limited to any particular environment except as specified in the appended claims. In general, PDF document management using system 10 includes automatically determining whether PDF documents are duplicate, updated, or new PDF documents, without having to use applications such as ADOBE ACROBAT EXCHANGE or ADOBE ACROBAT READER. As a result, in addition to eliminating the need to purchase and maintain such applications, the present invention may significantly reduce the time and effort expended for content-based document retrieval operations involving large numbers of PDF documents.

In one embodiment, system 10 includes a document database 12 that functions as a repository for reference information concerning PDF documents. Database 12 may include any suitable storage media at one or more locations, and reference to a "database" is meant to encompass all such storage media and associated data storage arrangements as are appropriate. Document information database 12 may contain reference information for PDF documents that system 10 has received from one or more appropriate sources, for example, PDF documents received from one or more applications (executing on the same or different computer systems as components of system 10), via one or more computer buses, local area networks (LANs), metropolitan area networks (MANs), wide area networks (WANs), portions of the Internet, or any other suitable links. Reference information stored in document information database 12 for a PDF document may include, for example and without limitation, a filename for the document, a title of the document, a subject of the document, an author of the document, a creator of the document, a producer of the document, a creation date for the document, a last modified date for the document, a number of pages of the document, whether or not the document is encrypted, and a file size for the document, singly or in any suitable combination. As described in more detail below, some or all of this stored reference information for previously received PDF documents may be compared with analogous information for a received PDF document to determine a verification status of the received PDF document.

System 10 receives PDF files 14, for example, from one or more applications (executing on the same or different computer systems as components of system 10) that retrieve PDF files 14 from local or remote storage for viewing based on instructions received from one or more users. Where appropriate, reference to system 10 "receiving" a PDF file 14 is meant to encompass system 10 receiving pointer or other information indicating the physical storage location of the PDF file 14. Each PDF file 14 includes a corresponding PDF document 16 and an associated file header 18 containing pertinent information concerning the PDF document 16. In one embodiment, upon receiving one or more PDF files 14, an appropriate component of system 10 may initialize suitable parameters for constructing a PDF document object (e.g., in object-oriented programming, a self-contained entity comprising both data and procedures to manipulate the data) for each received PDF file 14. For example, the contents of a PDF document are typically represented as a tree of objects used to retrieve document information. Each object may have one of the following types: array, Boolean, dictionary, name, null, number, reference, stream, and string. Five of these are simple types, while the rest (array, dictionary, reference, and stream) include other types. For example, an array object contains a list of objects that can be of any type.

System 10 includes a document information extractor 20 that, in one embodiment, opens each received PDF file 14, in binary mode or otherwise, and searches the PDF document 16 and/or file header 18 for a PDF version number or similar identifier. If no PDF version number or similar identifier is found, then the PDF document 16 may be marked as an error document 22 and this status reported to another appropriate component of system 10. For example, document status recorder (not shown) may receive the status from document information extractor 20 and store the status in document information database 12 or elsewhere. If a PDF version number or similar identifier is found, document information extractor 20 also searches PDF document 16 and/or file header 18 to extract other information such as, for example and without limitation, a title of PDF document 16, a subject of PDF document 16, one or more pre-defined keywords contained in PDF document 16, an author of PDF document 16, a creator of PDF document 16, a producer of PDF document 16, a creation date of PDF document 16, a last modified date of PDF document 16, a number of pages in PDF document 16, whether or not PDF document 16 is encrypted, and a file size of PDF document 16, singly or in any suitable combination. Extracted information concerning a received PDF document 16 may be referred to collectively as document information 24 for the received PDF document 16.

System 10 may include a document information comparer 26 that compares document information 24 extracted from PDF file 14 for the received PDF document 16 with analogous reference information stored in document information database 12 for previously received PDF documents 16 to determine a verification status for the received PDF document 16. Although a separate document information comparer 26 is described as an example, this function may be performed in any suitable manner by any suitable component of system 10, for example, by the same component responsible for extracting document information 24 from PDF files 14. In one embodiment, a verification status for a received PDF document 16 may be classified as follows. A received PDF document 16 may be classified as a "duplicate" document 28 if all the extracted document information 24 exactly matches (e.g., on a field by field basis) analogous reference information stored in document information database 12 for a previously received PDF document 16. A received PDF document 16 may be classified as an "updated" document 30 if all the extracted document information 24 exactly matches (e.g., on a field by field basis) analogous reference information stored in document information database 12 for a previously received PDF document 16, except that one or more of the last modified date, the number of pages, and the file size have changed. A received PDF document 16 may be classified as a "new" document 32 if the extracted document information 24 does not match analogous reference information stored in document information database 12 for a previously received PDF document 16. Once determined, the verification status of a received PDF document 16 may be recorded in document information database 12 or elsewhere, for example, by a document status recorder (not shown) as described above. Although a separate document status recorder is described as an example, this function may be performed in any suitable manner by any suitable component of system 10, for example, by the same component responsible for extracting document information from PDF files 14.

If a received PDF document 16 is determined to be an error document 22 or a duplicate document 28, then the PDF document 16 may be, for example, stored off-line for further validation (in the case of an error document 22) or returned to the application from which PDF document 16 was received for further processing (in the case of a duplicate document 28). If the received PDF document 16 is determined to be an updated document 30 or a new document 32, then the received PDF document 16 may be processed further within system 10 as described below before being returned to the application from which the PDF document 16 was received.

System 10 may include a document information updater 34. If a received PDF document 16 is determined to be an updated document 30 (i.e. certain extracted document information 24 matches analogous reference information), then document information updater 34 may update the last modified date, number of pages, and/or file size stored in document information database 12 for the received PDF document 16. If a received PDF document 16 is determined to be a new document 32 (i.e. no extracted document information 24 matches analogous reference information), then document information updater 34 may store all extracted document information 24 for the received PDF document 16 in document information database 12. After some of all extracted document information 24 for the received PDF document 16 has been stored in document information database 12, the PDF file 14 for PDF document 16 and its determined status (i.e. duplicate, updated, or new) may be returned to the application from which it was received for further processing.

Although not explicitly shown, the components, functions, and tasks described above may be computer-implemented using software executed on one or more appropriate computer systems at one or more locations. Each computer system may include one or more suitable input devices, output devices, mass storage media, processors, memory, or other components for receiving, processing, storing, and communicating information according to the operation of system 10. Where appropriate, each computer system may operate according to suitable input from any number of associated users. Depending on the implementation, components of system 10 may be wholly or partially integrated, wholly or partially distributed, or arranged in any other suitable manner. Components of system 10 may be coupled, physically or logically, to one another in any suitable manner, for example, using one or more computer buses, local area networks (LANs), metropolitan area networks (MANs), wide area networks (WANs), portions of the Internet, or any other suitable links.

FIG. 2 illustrates an example computer-implemented method 100 of PDF document management. At step 102, one or more incoming files are received (e.g., from one or more applications executing on the same or different computer systems as components of system 10) and, at step 104, the received files are evaluated to determine whether any are PDF files 14. If none of the received files are determined to be PDF files 14 at step 106, then at step 108 the application(s) from which the files were received are notified and processing of the files is returned, at which point method 100 ends. If any of the received files are determined to be PDF files 14 at step 106, then at step 110 the PDF files 14 are selected for further processing within system 10. At step 112, suitable parameters for constructing a PDF document object for each received PDF file 14 may be initialized.

At step 114, a first PDF file 14 is selected (arbitrarily or otherwise) and, at step 116, document information extractor 20 opens the PDF file 14 and searches the PDF file 14 for a PDF version number or similar identifier. If no PDF version number or similar identifier can be found, then the associated PDF document 16 may be marked as an error document 22 at step 118, stored off-line for further validation at step 120, and its status recorded in document information database 12 or elsewhere at step 122. Alternatively, if a PDF version number or similar identifier can be found, then document information extractor 20 extracts appropriate document information 24 from the PDF file 14 at step 124. As described above, document information 24 may be extracted from the associated PDF document 16 and/or file header 18 and may include, for example and without limitation, title, subject, one or more pre-defined keywords, author, creator, producer, creation date, last modified date, number of pages, whether or not encrypted, and file size, singly or in any suitable combination.

At step 126, extracted document information 24 for the received PDF document 16 is compared with analogous reference information stored in document information database 12 for previously received PDF documents 16 to determine a verification status for the received PDF document 16. If the verification status is determined to be "duplicate" at step 128, no updating of document information database 12 is needed and the verification status may simply be recorded in document information database 12 or elsewhere at step 122. If the status is instead determined to be "updated" or "new" at step 128 (i.e. not "duplicate"), then some or all, respectively, of the extracted document information 24 for the received PDF document 16 may be stored in document information database 12 at step 130. The verification status may be recorded in document information database 12 or elsewhere at step 122.

After the verification status of the received PDF document 16 has been recorded, the application from which the PDF document 16 was received may be notified of the status and processing of the PDF file 14 for PDF document 16 returned at step 132. If there is another received PDF file 14 at step 134, the next PDF file 14 is selected at step 136 and method 100 returns to step 116. If there are no more received PDF files 14 at step 134, method 100 ends.

Although example embodiments of the present invention are illustrated in the accompanying drawings and described in the foregoing description, it will be understood that the invention is not limited to the embodiment disclosed, but is capable of numerous rearrangements, modifications and substitutions without departing from the spirit of the invention as set forth and defined by the following claims.

What is claimed is:

1. A method of Portable Document Format (PDF) document management, comprising:

receiving a plurality of files from one or more external applications;

determining whether each received file is a PDF file;

extracting key information from each received PDF file concerning a corresponding PDF document contained in the PDF file;

comparing the extracted key information for each received PDF document with analogous reference information stored for a plurality of previously received PDF documents;

determining a verification status for each received PDF document according to the comparison and providing the verification status to the external application from which the PDF file was received, the verification status indicating that the received PDF document is a duplicate document if all the extracted key information for the received PDF document matches analogous reference information for a previously received PDF document, the verification status indicating that the received PDF document is an updated document if certain but not all the key extracted information for the received PDF document matches analogous reference information for a previously received PDF document, the verification status indicating that the received PDF document is a new document if at least certain extracted key information for the received PDF document does not match analogous reference information for a previously received PDF document;

if the received PDF document is a duplicate document, returning processing of the received PDF file to the external application from which it was received, without storing any extracted key information for the received PDF document as reference information;

if the received PDF document is an updated document, storing certain extracted key information for the received PDF document to update the reference information, and returning processing of the received PDF file to the external application from which it was received; and if the received PDF document is a new document, storing all extracted key information for the received PDF document as reference information, and returning processing of the received PDF file to the external application from which it was received.

2. The method of claim 1, wherein determining whether a received file is a PDF file is based on whether the received file contains a PDF version number.

3. The method of claim 1, wherein at least some of the key information for the received PDF document is extracted from a header of the corresponding PDF file.

4. The method of claim 1, wherein the extracted key information comprises one or more of title, subject, keyword, author, creator, producer, creation date, last modified date, number of pages, whether or not encrypted, and file size information.

5. The method of claim 1, further comprising recording the verification status determined for each received PDF document.

6. A system for Portable Document Format (PDF) document management, comprising:

a database operable to store reference information for a plurality of previously received PDF documents; and one or more software components collectively operable to:

receive a plurality of files from one or more external applications;

determine whether each received file is a PDF file;

extract key information from each received PDF file concerning a corresponding PDF document contained in the PDF file;

compare the extracted key information for each received PDF document with analogous reference information stored in the database for previously received PDF documents;

determine a verification status for each received PDF document according to the comparison and provide the verification status to the external application from which the PDF file was received, the verification status indicating that the received PDF document is a duplicate document if all the extracted key information for the received PDF document matches analogous reference information for a previously received PDF document, the verification status indicating that the received PDF document is an updated document if certain but not all the key extracted information for the received PDF document matches analogous reference information for a previously received PDF document, the verification status indicating that the received PDF document is a new document if at least certain extracted key information for the received PDF document does not match analogous reference information for a previously received PDF document;

if the received PDF document is a duplicate document, return processing of the received PDF file to the external application from which it was received, without storing any extracted key information for the received PDF document in the database as reference information;

if the received PDF document is an updated document, store certain extracted key information for the received PDF document in the database to update the reference information, and return processing of the received PDF file to the external application from which it was received; and if the received PDF document is a new document, store all extracted key information for the received PDF document in the database as reference information, and return processing of the received PDF file to the external application from which it was received.

7. The system of claim 1, wherein the one or more software components are operable to determine whether a received file is a PDF file according to whether the received file contains a PDF version number.

8. The system of claim 1, wherein the one or more software components are operable to extract at least some of the key information for the received PDF document from a header of the corresponding PDF file.

9. The system of claim 1, wherein the extracted key information comprises one or more of title, subject, keyword, author, creator, producer, creation date, last modified date, number of pages, whether or not encrypted, and file size information.

10. The system of claim 1, wherein the one or more software components are operable to record the verification status determined for each received PDF document.

11. Software for Portable Document Format (PDF) document management, the software being embodied in computer-readable media and when executed operable to:

receive a plurality of files from one or more external applications;

determine whether each received file is a PDF file;

extract key information from each received PDF file concerning a corresponding PDF document contained in the PDF file;

compare the extracted key information for each received PDF document with analogous reference information stored for a plurality of previously received PDF documents;

determine a verification status for each received PDF document according to the comparison and provide the verification status to the external application from which the PDF file was received, the verification status indicating that the received PDF document is a duplicate document if all the extracted key information for the received PDF document matches analogous reference information for a previously received PDF document, the verification status indicating that the received PDF document is an updated document if certain but not all the key extracted information for the received PDF document matches analogous reference information for a previously received PDF document, the verification status indicating that the received PDF document is a new document if at least certain extracted key information for the received PDF document does not match analogous reference information for a previously received PDF document;

if the received PDF document is a duplicate document, return processing of the received PDF file to the external application from which it was received, without storing any extracted key information for the received PDF document as reference information;

if the received PDF document is an updated document, store certain extracted key information for the received PDF document to update the reference information, and return processing of the received PDF file to the external application from which it was received; and if the received PDF document is a new document, store all extracted key information for the received PDF document as reference information, and return processing of the received PDF file to the external application from which it was received.

12. The software of claim 11, operable to determine whether a received file is a PDF file is based on whether the received file contains a PDF version number.

13. The software of claim 11, operable to extract at least some of the key information for the received PDF document from a header of the corresponding PDF file.

14. The software of claim 11, wherein the extracted key information comprises one or more of title, subject, keyword, author, creator, producer, creation date, last modified date, number of pages, whether or not encrypted, and file size information.

15. The software of claim 11, operable to record the verification status determined for each received PDF document.

16. A system for Portable Document Format (PDF) document management, comprising:

means for receiving a plurality of files from one or more external applications;

means for determining whether each received file is a PDF file;

means for extracting key information from each received PDF file concerning a corresponding PDF document contained in the PDF file;

means for comparing the extracted key information for each received PDF document with analogous reference information stored for a plurality of previously received PDF documents;

means for determining a verification status for each received PDF document according to the comparison and providing the verification status to the external application from which the PDF file was received, the verification status indicating that the received PDF document is a duplicate document if all the extracted key information for the received PDF document matches analogous reference information for a previously received PDF document, the verification status indicating that the received PDF document is an updated document if certain but not all the key extracted information for the received PDF document matches analogous reference information for a previously received PDF document, the verification status indicating that the received PDF document is a new document if at least certain extracted key information for the received PDF document does not match analogous reference information for a previously received PDF document;

means for, if the received PDF document is a duplicate document, returning processing of the received PDF file to the external application from which it was received, without storing any extracted key information for the received PDF document as reference information;

means for, if the received PDF document is an updated document, storing certain extracted key information for the received PDF document to update the reference information, and returning processing of the received PDF file to the external application from which it was received; and means for, if the received PDF document is a new document, storing all extracted key information for the received PDF document as reference information, and returning processing of the received PDF file to the external application from which it was received.

* * * * *